(12) United States Patent
Veltrop et al.

(10) Patent No.: US 11,974,679 B2
(45) Date of Patent: May 7, 2024

(54) SYSTEMS AND METHODS OF FOOD PREPARATION

(71) Applicant: Marmon Foodservice Technologies, Inc., Osseo, MN (US)

(72) Inventors: Loren Veltrop, Chicago, IL (US); Arshad Baxamusa, Northbrook, IL (US); Robert Duncan, South Elgin, IL (US); Jacob Kane, Lake Zurich, IL (US); Collin Psenka, Hawthorn Woods, IL (US); Jonathan Sammon, Hills, OH (US); Sathvik Sanagala, Naperville, IL (US); Nicole Szewczyk, Lansing, IL (US); Andrew Thompson, Mudelein, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 1519 days.

(21) Appl. No.: 16/246,032

(22) Filed: Jan. 11, 2019

(65) Prior Publication Data
US 2019/0208927 A1 Jul. 11, 2019

Related U.S. Application Data

(60) Provisional application No. 62/616,138, filed on Jan. 11, 2018.

(51) Int. Cl.
*A47F 10/06* (2006.01)
*A21C 15/00* (2006.01)
(Continued)

(52) U.S. Cl.
CPC .............. *A47F 10/06* (2013.01); *A21C 15/00* (2013.01); *A21D 13/32* (2017.01); *A23L 5/10* (2016.08);
(Continued)

(58) Field of Classification Search
CPC . A21C 15/00; A21D 13/32; A23L 5/10; A47F 10/06; A23P 20/20; A47J 27/14;
(Continued)

(56) References Cited

U.S. PATENT DOCUMENTS 3,183,856 A 5/1965 Jolly
3,266,442 A 8/1966 Udall et al.
(Continued)

FOREIGN PATENT DOCUMENTS

CA 2923038 A1 12/2015
CN 105608794 5/2016
(Continued)

OTHER PUBLICATIONS

APW Wyott CW-5 5 Pan Drop In Refrigerated Cold Food Well 120V, Apr. 17, 2014, WebstrauntStore, <https://web.archive.org/web/20140417123547/http://www.webstaurantstore.com:80/apw-wyott-cw-5-5-pan-drop-in-refrigerated-cold-food-well-120v/135CW5%20%20%20%20%20%20120.html> (Year: 2014).*

(Continued)

*Primary Examiner* — Dana Ross
*Assistant Examiner* — James F Sims, III
(74) *Attorney, Agent, or Firm* — Andrus Intellectual Property Law, LLP

(57) ABSTRACT

Food orders are divided into components or tasks. Systems and methods of food order preparation communicate instructions for automated actions to devices to carry out the automated actions. A toaster operates to toast a bun according to toaster settings. A bun magazine operates to deliver a bun into the toaster. A condiment dispenser receives the bun from the toaster and operates to dispense at least one portion of at least one condiment onto the bun.

20 Claims, 12 Drawing Sheets

(51) Int. Cl.
  *A21D 13/32* (2017.01)
  *A23L 5/10* (2016.01)
  *A23P 20/20* (2016.01)
  *A47J 27/14* (2006.01)
  *A47J 37/04* (2006.01)
  *A47J 37/08* (2006.01)
  *G06Q 50/12* (2012.01)
  *G07F 9/10* (2006.01)

(52) U.S. Cl.
  CPC .............. *A23P 20/20* (2016.08); *A47J 27/14* (2013.01); *A47J 37/044* (2013.01); *A47J 37/0857* (2013.01); *G07F 9/10* (2013.01); *G06Q 50/12* (2013.01)

(58) Field of Classification Search
  CPC ....... A47J 37/044; A47J 37/0857; G07F 9/10; G06Q 50/12
  USPC .......................................................... 99/339
  See application file for complete search history.

(56) References Cited

U.S. PATENT DOCUMENTS

| | | | |
|---|---|---|---|
| 3,343,715 | A | 9/1967 | Edwards |
| 3,915,316 | A | 10/1975 | Pomara, Jr. |
| 4,006,831 | A | 2/1977 | Jimenez |
| 4,034,661 | A | 7/1977 | Boosalis et al. |
| 4,054,015 | A | 10/1977 | Rowell |
| 4,261,257 | A | 4/1981 | Henderson et al. |
| 4,503,502 | A | 3/1985 | Chapin |
| 4,530,632 | A | 7/1985 | Sela |
| 4,547,851 | A | 10/1985 | Kurland |
| 4,553,222 | A | 11/1985 | Kurland et al. |
| 4,620,826 | A | 11/1986 | Rubio et al. |
| 4,677,888 | A | 7/1987 | Terrangnoli |
| 4,760,777 | A | 8/1988 | Welsh |
| 4,797,818 | A | 1/1989 | Cotter |
| 4,919,950 | A | 4/1990 | Mak |
| 4,922,435 | A | 5/1990 | Cahlander et al. |
| 4,944,218 | A | 7/1990 | Cresson |
| 5,000,345 | A | 3/1991 | Brogna et al. |
| 5,127,544 | A | 7/1992 | Robinson et al. |
| 5,132,914 | A | 7/1992 | Cahlander et al. |
| 5,172,328 | A | 12/1992 | Cahlander et al. |
| 5,253,762 | A | 10/1993 | Duncan |
| 5,540,943 | A * | 7/1996 | Naramura ................ A21C 9/04 426/231 |
| 5,546,848 | A | 8/1996 | Naramura |
| 5,562,183 | A | 10/1996 | Naramura |
| 5,724,886 | A | 3/1998 | Ewald et al. |
| 5,755,149 | A | 5/1998 | Blanc et al. |
| 5,763,861 | A | 6/1998 | Herrera et al. |
| 6,236,974 | B1 | 5/2001 | Kolawa et al. |
| 6,298,331 | B1 | 10/2001 | Walker et al. |
| 6,473,739 | B1 | 10/2002 | Showghi et al. |
| 6,585,477 | B1 | 7/2003 | Lawrence |
| 6,647,864 | B1 | 11/2003 | Fang |
| 6,704,616 | B2 | 3/2004 | Formon |
| 6,751,525 | B1 | 6/2004 | Crisp, III |
| 6,930,296 | B2 | 8/2005 | Chen |
| 7,092,988 | B1 | 8/2006 | Bogatin et al. |
| 7,110,964 | B2 | 9/2006 | Tengler et al. |
| 7,141,258 | B2 | 11/2006 | Hillmann |
| 7,183,518 | B2 | 2/2007 | Near et al. |
| 7,353,136 | B2 | 4/2008 | Vock et al. |
| 7,478,749 | B2 | 1/2009 | Clothier et al. |
| 7,493,362 | B2 | 2/2009 | Bogatin et al. |
| 7,757,602 | B2 | 7/2010 | Aubry et al. |
| 7,885,852 | B2 | 2/2011 | Banerjee et al. |
| 8,307,951 | B2 | 11/2012 | Sus et al. |
| 8,448,567 | B2 | 5/2013 | Martin et al. |
| 8,458,311 | B2 | 6/2013 | Jang et al. |
| 8,498,896 | B2 | 7/2013 | Banerjee et al. |
| 9,049,875 | B2 | 6/2015 | Ewald et al. |
| 9,066,627 | B2 | 6/2015 | Baranowski et al. |
| 9,090,446 | B2 | 7/2015 | Crisp, III |
| 9,295,282 | B2 | 3/2016 | Vardakostas et al. |
| 9,326,544 | B2 | 5/2016 | Vardakostas et al. |
| 9,327,958 | B2 | 5/2016 | Angus et al. |
| 9,532,575 | B1 | 1/2017 | Donisi et al. |
| 9,585,401 | B2 | 3/2017 | Wiker et al. |
| 9,652,756 | B2 | 5/2017 | Knecht et al. |
| 9,701,530 | B2 | 7/2017 | Kline et al. |
| 9,718,568 | B2 | 8/2017 | Vardakostas et al. |
| 9,770,049 | B2 | 9/2017 | Vardakostas et al. |
| 9,788,687 | B2 | 10/2017 | Frehn et al. |
| 9,805,351 | B2 | 10/2017 | Harman |
| 10,067,109 | B2 | 9/2018 | Frehn et al. |
| 10,068,273 | B2 | 9/2018 | Frehn et al. |
| 10,086,525 | B2 | 10/2018 | Engel-Hall et al. |
| 2002/0059859 | A1 | 5/2002 | Verklan |
| 2003/0078793 | A1 | 4/2003 | Toth |
| 2004/0083201 | A1 | 4/2004 | Sholl et al. |
| 2004/0107141 | A1 | 6/2004 | Conkel et al. |
| 2004/0143503 | A1 | 7/2004 | Suthar |
| 2004/0238555 | A1 | 12/2004 | Parks |
| 2005/0049940 | A1 | 3/2005 | Tengler et al. |
| 2005/0182680 | A1 | 8/2005 | Jones, III et al. |
| 2007/0251521 | A1 | 11/2007 | Schackmuth et al. |
| 2008/0319864 | A1 | 12/2008 | Leet |
| 2009/0070229 | A1 | 3/2009 | Ansari et al. |
| 2009/0152345 | A1 | 6/2009 | Johnson |
| 2010/0049578 | A1 | 2/2010 | Salerno |
| 2010/0274633 | A1 | 10/2010 | Scrivano et al. |
| 2012/0143730 | A1 | 6/2012 | Ansari et al. |
| 2014/0324607 | A1 * | 10/2014 | Frehn ................... G06Q 50/12 705/15 |
| 2014/0330686 | A1 | 11/2014 | Kulasooriya et al. |
| 2015/0013550 | A1 | 1/2015 | Lin |
| 2015/0019354 | A1 | 1/2015 | Chan et al. |
| 2015/0187027 | A1 | 7/2015 | Lowe |
| 2015/0199667 | A1 | 7/2015 | Fernando et al. |
| 2016/0026958 | A1 | 1/2016 | Lee |
| 2016/0183728 | A1 | 6/2016 | Moma-M04-US1-APP-ADS et al. |
| 2016/0235239 | A1 | 8/2016 | Patadia |
| 2016/0236367 | A1 | 8/2016 | Engel-Hall et al. |
| 2016/0244311 | A1 | 8/2016 | Burks et al. |
| 2016/0253084 | A1 | 9/2016 | Deville et al. |
| 2016/0330982 | A1 | 11/2016 | Frehn et al. |
| 2016/0338545 | A1 | 11/2016 | Shah et al. |
| 2016/0379293 | A1 | 12/2016 | Barajas Gonzalez et al. |
| 2017/0018041 | A1 | 1/2017 | Fox |
| 2017/0024789 | A1 | 1/2017 | Frehn et al. |
| 2017/0065117 | A1 | 3/2017 | Reese et al. |
| 2017/0116661 | A1 | 4/2017 | Sundaram |
| 2017/0208940 | A1 | 7/2017 | Boudreault |
| 2017/0215631 | A1 | 8/2017 | Studor et al. |
| 2017/0221296 | A1 * | 8/2017 | Jain ..................... G07F 17/0064 |
| 2017/0258257 | A1 | 9/2017 | Guh |
| 2017/0280763 | A1 | 10/2017 | Nazarian et al. |
| 2018/0072555 | A1 * | 3/2018 | Fortunato ............... G07F 13/06 |
| 2018/0186022 | A1 | 7/2018 | Fox et al. |
| 2019/0066239 | A1 * | 2/2019 | Touchette ............. G06T 19/006 |

FOREIGN PATENT DOCUMENTS

| | | | |
|---|---|---|---|
| DE | 102005012536 | | 9/2006 |
| DE | 102015113398 | | 2/2017 |
| EP | 296496 | | 12/1988 |
| EP | 777201 | | 6/1997 |
| EP | 1337170 | | 3/2007 |
| WO | 199109558 | | 7/1991 |
| WO | 2009120262 | | 10/2009 |
| WO | 2013184910 | | 12/2013 |
| WO | WO-2013184910 A1 * | 12/2013 | ........... A21C 15/002 |
| WO | 2016079610 | | 5/2016 |
| WO | 2017136605 | | 8/2017 |
| WO | 2017177041 | | 10/2017 |

OTHER PUBLICATIONS

(56) References Cited

OTHER PUBLICATIONS

Holman, Double Conveyor Toaster Model DT14 Series Installation and Operation Instructions, Dec. 10, 2015 (Year: 2015).*
Hamilton Beach, Breakfast Sandwich Maker with Egg Cooker Ring, Customize Ingredients, Perfect, Aug. 6, 2013, Amazon.com, <https://www.amazon.com/Hamilton-Beach-25475A-Breakfast-Sandwich/dp/B00EI7DPOO> (Year: 2013).*
Eink, Electronic Shelf Label, Nov. 13, 2017, <https://web.archive.org/web/20171113172211/https://www.eink.com/electronic-shelf-label.html?type=application&id=5> (Year: 2017).*
PW Wyott CW-5 5 Pan Drop In Refrigerated Cold Food Well 120V, Apr. 17, 2014, WebstrauntStore, <https://web.archive.org/web/20140417123547/http://www.webstaurantstore.com:80/apw-wyott-cw-5-5-pan-drop-in-refrigerated-cold-food-well-120v/135CW5%20%20%20%20%20%20120.html> (Year: 2014).*
International Search Report and Written Opinion issued in corresponding PCT Application No. PCT/US2019/013262, dated Apr. 25, 2019.

* cited by examiner

SYSTEMS AND METHODS OF FOOD PREPARATION

CROSS-REFERENCE TO RELATED APPLICATIONS

The present application claims priority of U.S. Provisional Patent Application No. 62/616,138, filed on Jan. 11, 2018, the contents of which is hereby incorporated by reference in its entirety.

BACKGROUND

The present disclosure relates to the field of food preparation. More specifically, the present disclosure relates to methods of food preparation and order assembly in a restaurant or food service setting. Systems, including, but not limited to a preparation table and associated equipment that facilitate these tasks are also disclosed herein.

Many restaurant and food service settings, particularly quick services restaurants (QSR) use a combination of pre-prepared and on-demand prepared food components in order to assemble foods or ordered by customers, for example, hamburgers or sandwiches within a customer's time expectation. While one approach to order assembly would be to sequentially prepare each food component on demand in the order in which it is needed, customer food preparation time expectations are not met with such an approach.

Additionally, as the number of menu options and accommodation of customer special requests or customizations proliferate, management of a greater number and variety of order components is needed. Management of prepared food component inventory is more challenging as the number of food components increases. Also, as order assembly becomes more complicated, the assembly instructions are harder for food preparation workers to remember and correctly follow and further create a greater learning curve for new or inexperienced workers or for the introduction of new menu items. Finally, while food item packaging is supposed to improve product delivery and customer personalization, this frequently becomes an added source of complexity with numerous packaging types and potential for error between the packaging and the food contained therein.

Therefore, restaurants and food service industries can benefit from systems and methods that improve worker productivity, worker accuracy, and faster completion of customized food orders.

DETAILED DISCLOSURE

Figure 1:
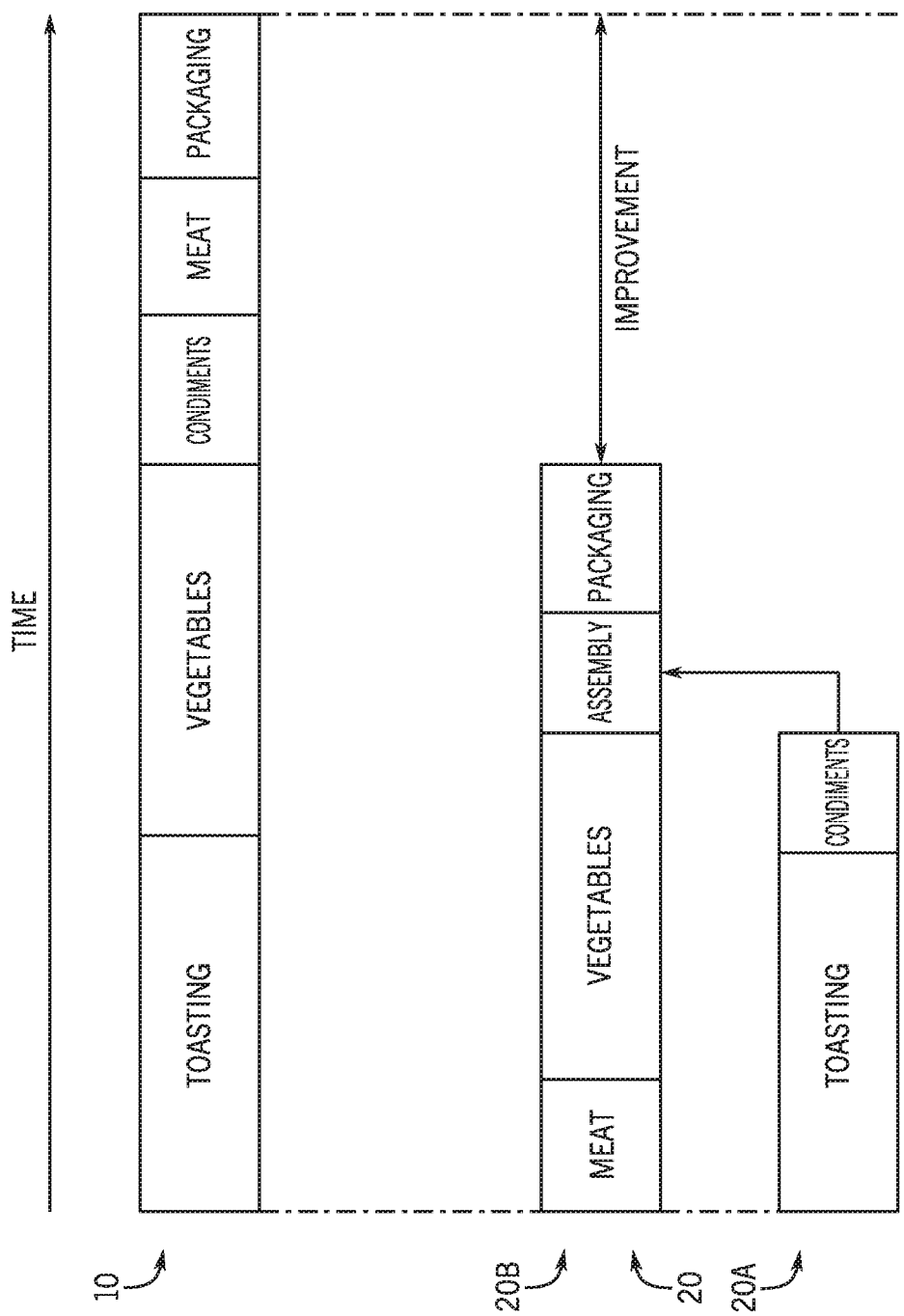
FIG. 1 depicts exemplary timelines of preparation of food order.

FIG. 1 depicts exemplary timelines of the preparation of a food order, for example, a hamburger sandwich. At reference No. 10, a sequential process for assembly of an order for a hamburger is presented. The bun is toasted. The cold vegetables are placed on the toasted bun, condiments are placed on the vegetables and/or bun. The meat is then placed in the sandwich and the bun portions placed together. The assembled sandwich is then packaged and the order is complete.

Reference No. 20 shows an exemplary bifurcated process in which automated tasks 20A are separated and occur in parallel to manual tasks 20B performed by the food preparation worker. In an exemplary embodiment as disclosed in further detail herein, the toasting and condiment operations can be automated and integrated with the point of sale (POS) system and/or kitchen management system (KMS) while the food service workers collects and assembles the interior of the sandwich, for example, the meat and vegetables prior to assembly of the entire sandwich for packaging and delivery. FIG. 1 presents one example of a sandwich assembly process in which portions of the process are carried out in parallel. In the example, an automated task 20A is performed in parallel to a manual task 20B. It will be recognized that this is one exemplary embodiment of a change in work flow or the method of the assembly of a food item. Other embodiments that are variations of the process shown in FIG. 1 will be recognized by a person of ordinary skill in the art in view of the present disclosure, including those that move or exchange tasks in the assembly process between the automated tasks 20A and the manual tasks 20B.

Figure 2:
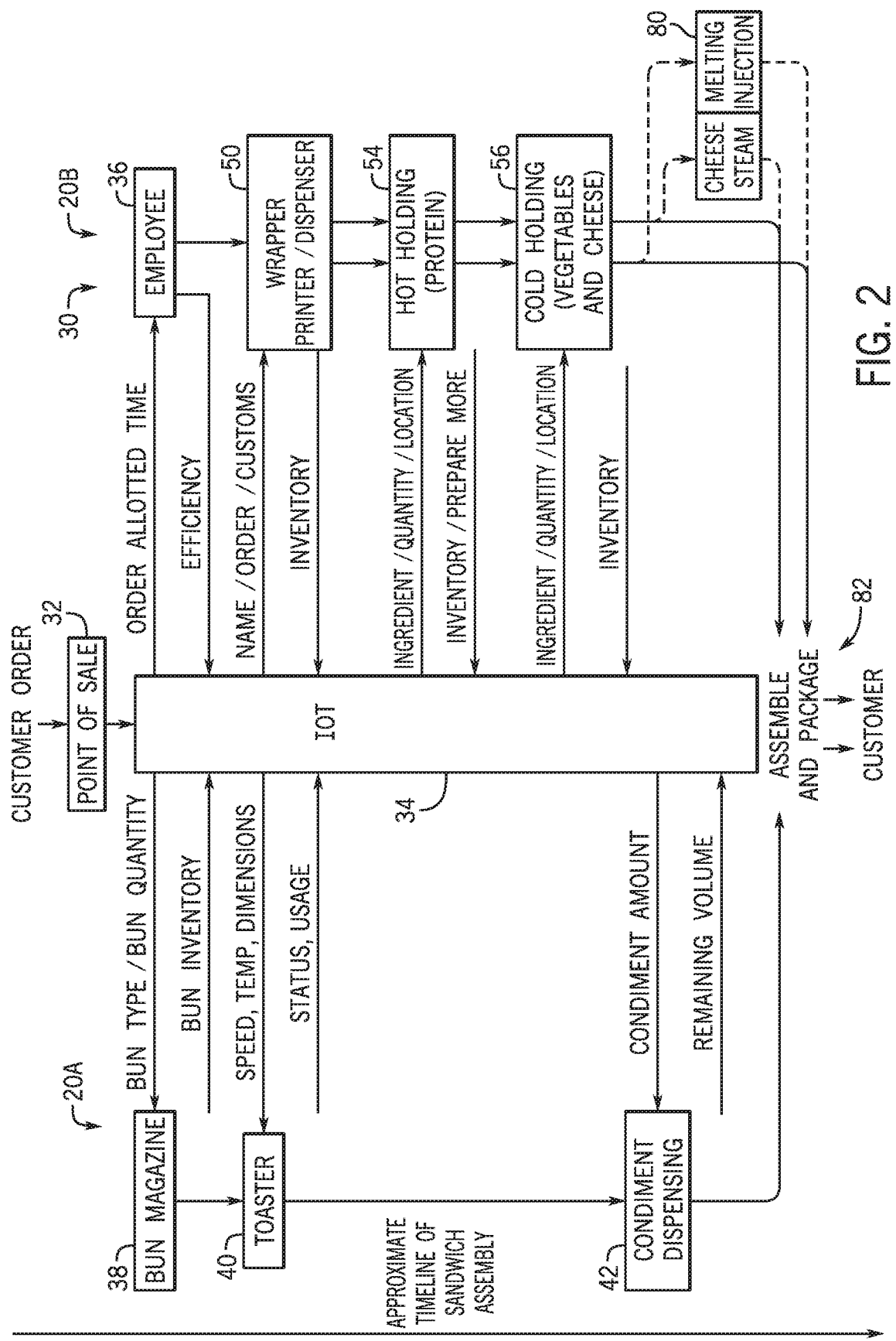
FIG. 2 is a system diagram of an exemplary embodiment of a sandwich preparation system.

FIG. 2 is a system diagram of an exemplary embodiment of a sandwich preparation system 30. The sandwich preparation system 30 receives a customer order at a point of sale (POS) system 32. The POS system 32 may be a register computer operated by a cashier or may be a drive through ordering system, or an online ordering system, or any other point of sale order entry arrangement as will be recognized by a person of ordinary skill in the art. The POS system 32 takes in the customer order which specifies one or more food items which require preparation and/or assembly. In the exemplary embodiment used herein, it is an order for a cheeseburger sandwich. The order for the cheeseburger sandwich is entered into the internet of things (IOT) system 34 which is exemplarily a cloud-computing enabled system whereby the data collection and serving of data with all of the communication-enabled devices of the kitchen/sandwich preparation system 30 is handled by one or more processors and/or servers. Portions of the IOT system 34 are exemplarily remotely located from the kitchen, although in other exemplary embodiments the processors and/or servers which carry out the functions of the IOT system 34 as described herein may also be located locally within a kitchen or restaurant facility.

As previously described, the POS may be integrated with or otherwise communicatively connected to a kitchen management system (KMS). It will be recognized that while the POS, KMS, and IOT may be referred to as separate components, one or more of these components may be integrated and provided as a single system. The person of ordinary skill in the art will recognize that despite variations in implementation the POS, KMS, and IOT operate in conjunction to take in customer orders and to communicate and coordinate operation of one or more automated devices in the automated sandwich preparation system 30 as described herein. Additionally, while portions of the POS, KMS, and IOT are provided locally to the rest of the sandwich preparation system, other portions may be wholly or partially provided from a remote location, for example through a networked or cloud-computing enabled implementation.

The customer order may be exemplarily provided to the KMS that identifies the components of the exemplary cheeseburger sandwich requiring assembly to complete the order. The KMS further may also operate to track, manage, and coordinate kitchen inventory and the order in which all of the ordered sandwiches are processed. In doing so, the KMS can provide control signals, for example through the IOT system to each of the devices in the sandwich preparation system 30, as described in further detail herein.

As described above with respect to FIG. 1, the sandwich preparation system 30 is bifurcated in process between an automated task 20A and an enhanced manual task 20B which occur simultaneously to speed completion of the order and delivery of the order to the customer. It will be recognized that while FIG. 2 presents one embodiment and arrangement of components, other embodiments may include more or fewer components and tasks in the automated task 20A. The employee 36 receives information regarding the customer's order from the KMS through the IOT system 34. This may include an identification of the complete order itself, as well as timing and order queuing and/or order priority information.

The employee 36 may receive this information through a head set or a graphical user interface, for example, but not limited to as presented on a graphical display in the kitchen. The graphical display in the kitchen may be mounted in the general area of a part of the prep table system in which the worker works. Multiple displays may provide information both generally and to specific workers. In a still further embodiment, graphical displays may be positioned in a table top of the prep table system and covered with a clear protective surface.

Figure 3:
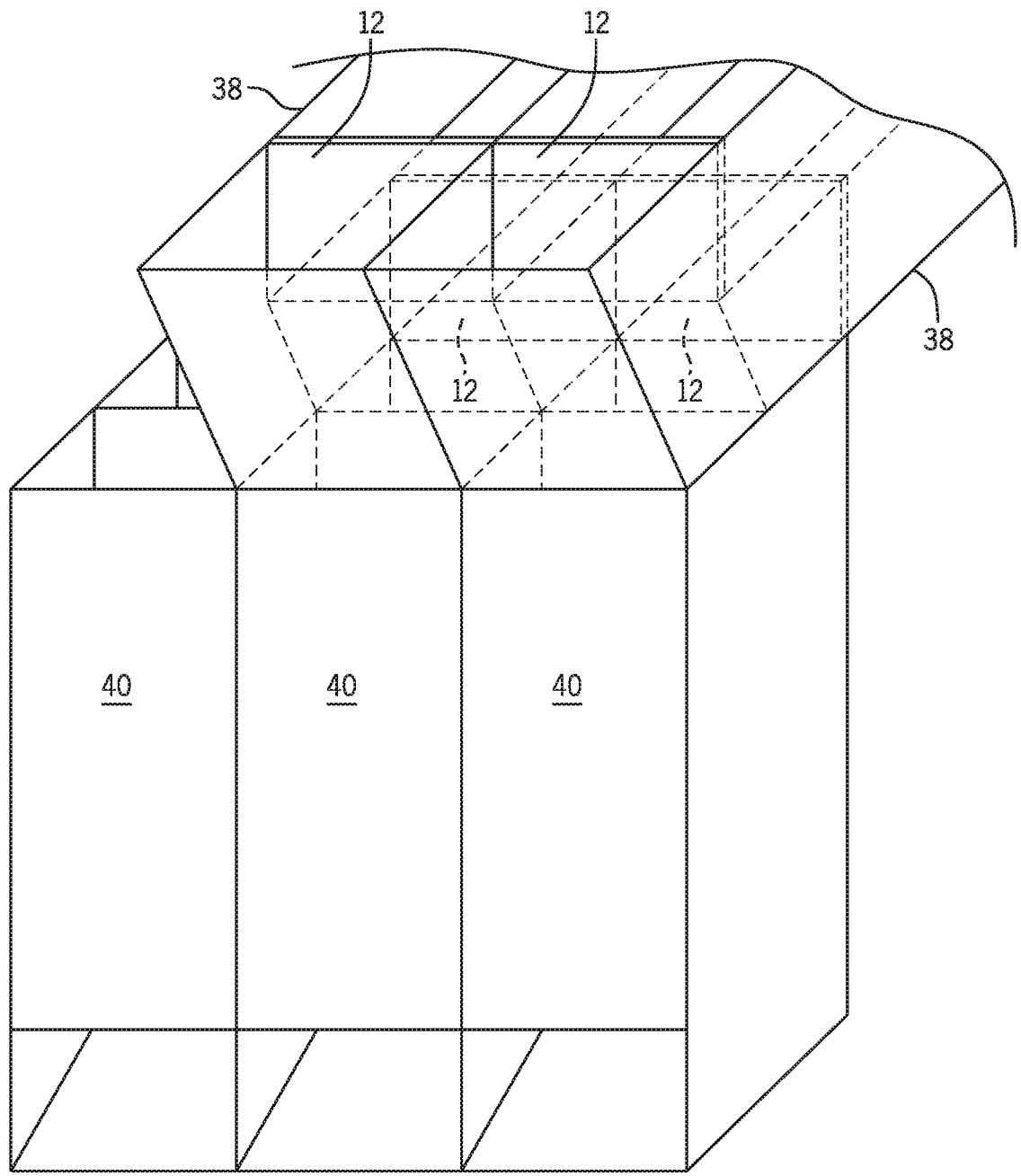
FIG. 3 depicts exemplary embodiments of bun magazines.

The communications of the IOT system 34, provide an identification of the required bun type and/or bun quantity from the KMS to a bun magazine 38. The bun magazine 38 selects and delivers the required bun to the toaster 40. FIG. 3 depicts an exemplary embodiment of a bun magazine. The bun magazines 38 may exemplarily be humidity and/or temperature controlled cabinets which allow buns to stay fresh longer before toasting. The bun magazines 38 may be arranged relative to the toaster 40 such that the bun magazine operates to dispense a selected bun into a toaster 40 for toasting. The buns are dispensed from the bun magazine 38 by a gravity feed, although it will be recognized that buns may be dispensed by conveyor as well. In additional embodiments, the buns may be treated by steam injection or water misting just before toasting to improve moisture and quality in which the toasting will seal in the moisture directly after the misting or steam injection.

The bun magazine 38 may be configured in a manner so as to be used with and/or secured to an existing toaster 40. In other embodiments, the toaster 40 and bun magazine 38 may be constructed as a single unit. As depicted in FIG. 3, one bun magazine 38 may be associated with one toaster 40 and each bun magazine and toaster may be configured to toast a particular type of bun. In use, one toaster 40 may be provided without a bun magazine 38 for use by a kitchen worker to manually load a specialty bun, while the bun magazine enabled toasters provide toasting for the most frequently used buns. The bun magazine 38 may include gates 12 operated by servo motors to control the release of a bun from the controlled environment of the bun magazine 38 into the toaster 40. Selective actuation of the gates 12 can control dispense of a bun from the bun magazine 38 into the toaster 40.

In exemplary embodiments, the toaster 40 can be operated with or without a bun magazine 38. The toasters 40 and/or bun magazines 38 can be specialized to a specific type of bun or can be a general toaster for a plurality of types. In exemplary embodiments, a bun magazine may be operable to selectively pick and/or deliver a specific bun from a variety of low-volume use buns and may further use a single-bun type magazine for high-volume use buns. In a further exemplary embodiment, the toaster 40 is a two-sided toaster. The crown and heel can be loaded into the toaster together either manually or from the bun magazine to allow simultaneous toasting of both bun portions rather than toasting the crown and heel in series. It will be recognized that in embodiments automation of bun toasting may eliminate human error of being incorrectly loaded into the toaster or the toasting of the wrong type of bun for the customer order.

Figure 4:
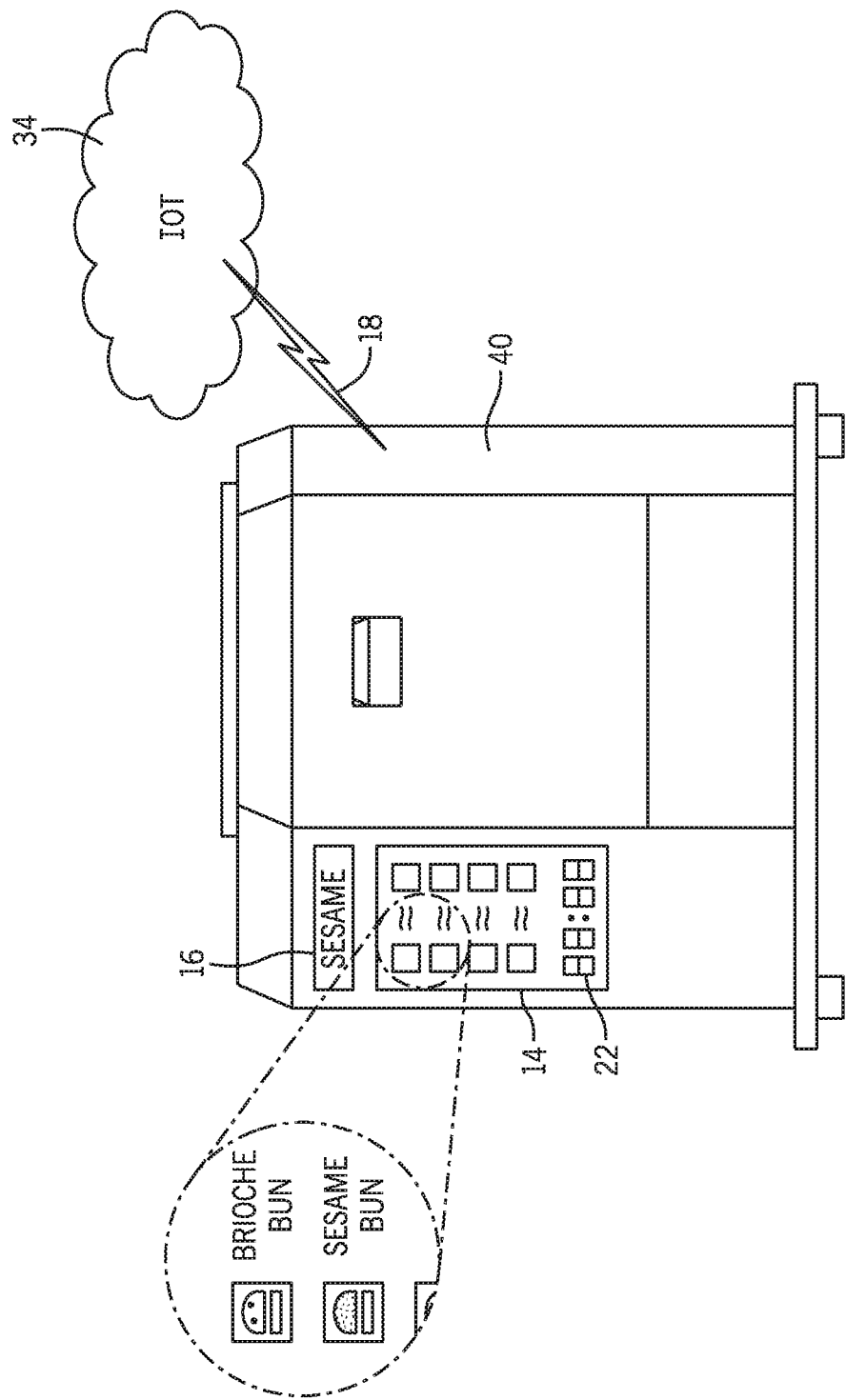
FIG. 4 depicts an exemplary embodiment of a smart toaster.

FIG. 4 depicts an exemplary embodiment of a smart toaster. Examples of toasters are further provided in U.S. patent application Ser. No. 15/859,860 entitled "Toaster with Adjustable Conveyor" which is incorporated by reference herein in its entirety. In an intermediate embodiment between fully manual operation and a fully automated operation, the toaster 40 is adjustable based upon a selected type of bun which is associated to particular toaster settings including, but not limited to toaster heat, speed, compression, width, a conveyor belt-platen gap, and/or belt tension. The toaster 40 includes a user interface 14, which may be a touchscreen or physical buttons and which provides for a variety of inputs whereby a kitchen worker may identify a type of bun or the toasting conditions for a type of bun and coordinate loading and operation of the bun magazine to hold the type of bun specified to the toaster 40. Upon selection of the type of bun to be toasted, or the toasting conditions, the current settings for the toaster are presented on a graphical display 16.

In a still further exemplary embodiment, the toaster 40 includes a communicative connection 18 to the IOT system 34 and receives the toasting instructions directly from the KMS through the IOT system 34 without using manual selection of toaster settings. The communicative connection may be a wired or wireless connection and the IOT system 34 may further provide wired or wireless communication with the KMS. The toaster 40 can receive individual instructions for a variety of different buns to be toasted and adjust the associated settings of toaster operation to accommodate for each instruction. Alternatively, the toaster 40 may receive an assignment of a particular toaster setting and receive instructions from the KMS and IOT 34 each time that a bun is to be toasted to the assigned settings. Similar instructions may be provided to the bun magazine as described above.

The toaster 40 may further include a real-time clock that provides an indication of the toasting time under the current settings. As previously noted, the toaster 40 may be operated in a variety of settings of for example, temperature and conveyor speed while achieving the same toasting treatment of buns. The toaster may be operated through a variety of these combinations and in configuration of settings use a lower platen temperature and a slower conveyor speed to produce a low or efficient power operation, while in another configuration of settings, the toaster is operated with a high platen temperature and a high conveyor speed to maximize toasted bun throughput.

In another exemplary embodiment, the toaster 40 may be integrated with a part of a bun holding system. The holding system may receive toasted buns in a climate controlled to prolonged pressure palatability of the toasted buns. This may exemplarily use a combination of temperature and humidity. In a related embodiment, the buns may be par (or partially) toasted and held. The par toasted buns may be held in the bun magazine for longer, while the remaining toasting time for fully toasted bun can be reduced. In a still further embodiment, buns may be held in a first environment (e.g. specified temperature and/or humidity) for preservation and in a second environment (e.g. specified temperature and/or humidity) shortly before toasting. This may be used to condition the bun either for improved toasting/palatability and/or for faster toasting.

Returning back to FIG. 2, the IOT system not only facilitates the provision of instructions from the KMS to the devices within the kitchen, but also operates to receive feedback information data from the devices. The bun magazine 38 exemplarily returns information to the IOT system 34, for example, information regarding bun inventory which may exemplarily include information regarding numbers of various types of buns remaining in the bun magazine 38 as well as the approximate or relative age of the buns in the bun magazine. Similarly, the toaster 40 provides feedback data to the IOT system 34. The toaster 40 may exemplarily provides information regarding a toaster status, and/or data regarding toaster usage which may help to provide feedback control of IOT system 34 instructions to the toaster, as well as maintenance or other monitoring of the toaster 40 itself. The toaster 40 may exemplarily have features or embodiments that are adaptable to increase toasting throughput during high order volume times. As previously noted, in one exemplary embodiment, the toaster 40 may operate in a high power consumption mode with fast toasting throughput for use during high volume times and a slower toasting mode at a more energy efficient operation for slower order volume times. In other embodiments, multiple toasters 40 may be simultaneously available and operable by the IOT system 34. In one exemplary embodiment, during high volume time, each of a plurality of toasters may operate to toast a single type of high order volume bun while one toaster is used for custom low volume toasting operations. During periods of low order volume, all of the toasting may be done through the adjustable or custom toaster arrangement.

In exemplary embodiments, the toaster 40 provides the toasted buns to an automated condiment dispensing system 42. The automated condiment dispenser 42 may receive an order of a condiment and an amount of that condiment from the IOT system 34. In still further exemplary embodiments, the automated condiment dispenser 42 may receive an identification of a condiment, particularly in embodiments wherein multiple condiments may be automatedly dispensed onto the toasted bun. For example, one or more of ketchup, mustard, and mayonnaise may be dispensed onto a toasted bun. In still further exemplary embodiments, custom condiment or custom flavored condiments may be produced by the automated condiment dispenser 42. Co-pending U.S. patent application Ser. No. 15/353,494 entitled "Systems and Methods of Custom Condiment Dispensing" provides a description of exemplary embodiments of automated condiment dispensers which may be used in a system described herein or from which a person of ordinary skill in the art will recognize further embodiments based upon the present disclosure.

Figure 5:
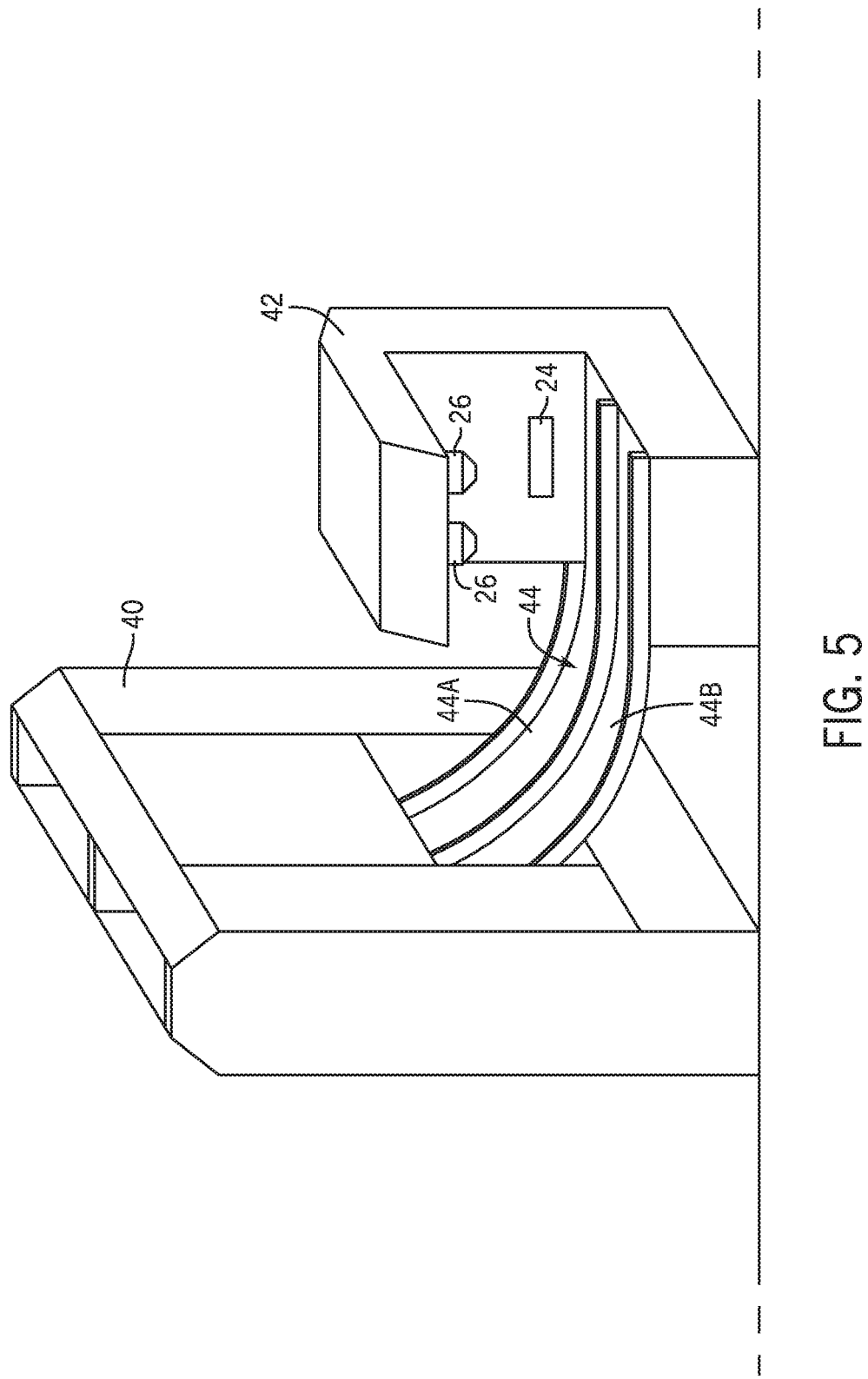
FIG. 5 depicts an exemplary embodiment of a toaster and automated condiment dispenser.

FIG. 5 depicts an exemplary embodiment of toaster 40 in connection with an automated condiment dispenser 42. The toaster 40 includes any combination of the features as described above and further may have received the bun from a bun magazine 38. The condiment dispenser 42 includes a communicative connection, for example, either wired or wireless, to the IOT system 34, such that condiment instructions can be provided to the condiment dispenser 42 through the TOT system 34. The condiment dispenser 42 receives an instruction of condiments to be dispensed on a bun and operates to detect the toasted bun. In another embodiment, the condiment dispenser detects a toasted bun and then queries for a condiment dispense instruction. The toaster 40 may be physically connected to the condiment dispenser 42, for example with a chute 44 that directs toasted bun portions from the toaster 40 into relative proximity with the condiment dispenser 42. As depicted in FIG. 5, the chute 44 exemplarily provides two paths 44A, 44B to catch both bun halves as they are dispensed from different toasting paths of the toaster 40. Exemplarily, the crown portion of the bun may move within the path 44A, while the heel portion of the bun is conveyed from the toaster 40 to the condiment dispenser 42 by the path 44B. The condiment dispenser 42 includes at least one sensor 24 that is used to locate the existence and location of the toasted bun portions, which may be located in part of the chute 44.

The condiment dispenser 42 exemplarily operates to identify the location of the toasted bun portion and to dispense the specified condiment in a specified volume commensurate with a food order to be assembled. Exemplarily, the buns leave the toaster in a predictable orientation and fall down the paths 44A and 44B of the chute 44 into the condiment dispenser 42. The at least one sensor 24 may be one or more of a computer vision system and a load cell. In other embodiments, the condiment dispenser 42 further uses a physical obstruction or feature, for example, a gate or depression, to locate the bun relative to the condiment dispenser 42. This physical feature may further position the received bun portions relative to the at least one sensor 24 such that an existence of the bun portions can be detected and determined and the condiment is dispensed in the proper location on the bun. The condiment is dispensed from the condiment dispenser through a nozzle 26 of the condiment dispenser. In an embodiment, the bun portion stops at a particular position relative to a nozzle, for example, due to an obstruction, and the condiment can be dispensed onto the bun portion. In another embodiment, the condiment dispenser operates to move the nozzle 26 to the detected location of the bun portion.

In this manner, as depicted in FIG. 2, once the customer order is received in the KMS, communication through the IOT system 34 and the devices in the kitchen enable the entire procedure of bun selection, toasting, and condiment dispensing can be automated such that the workers attention and effort in the order assembly can be focused on the manual tasks 20B associated with order assembly and completion.

In a further embodiment, the dispense of the packaging for the ordered sandwich can be automatically created and/or dispensed. While FIG. 2 depicts the automated dispense of the packaging from a packaging dispenser 50 as the first step in the manual tasks 20B, the action can be performed based upon communications from the KMS through the IOT system 34 to the packaging dispenser 50, and the manual tasks 20B performed by an employee begin after the dispense of the packaging.

Figure 6:
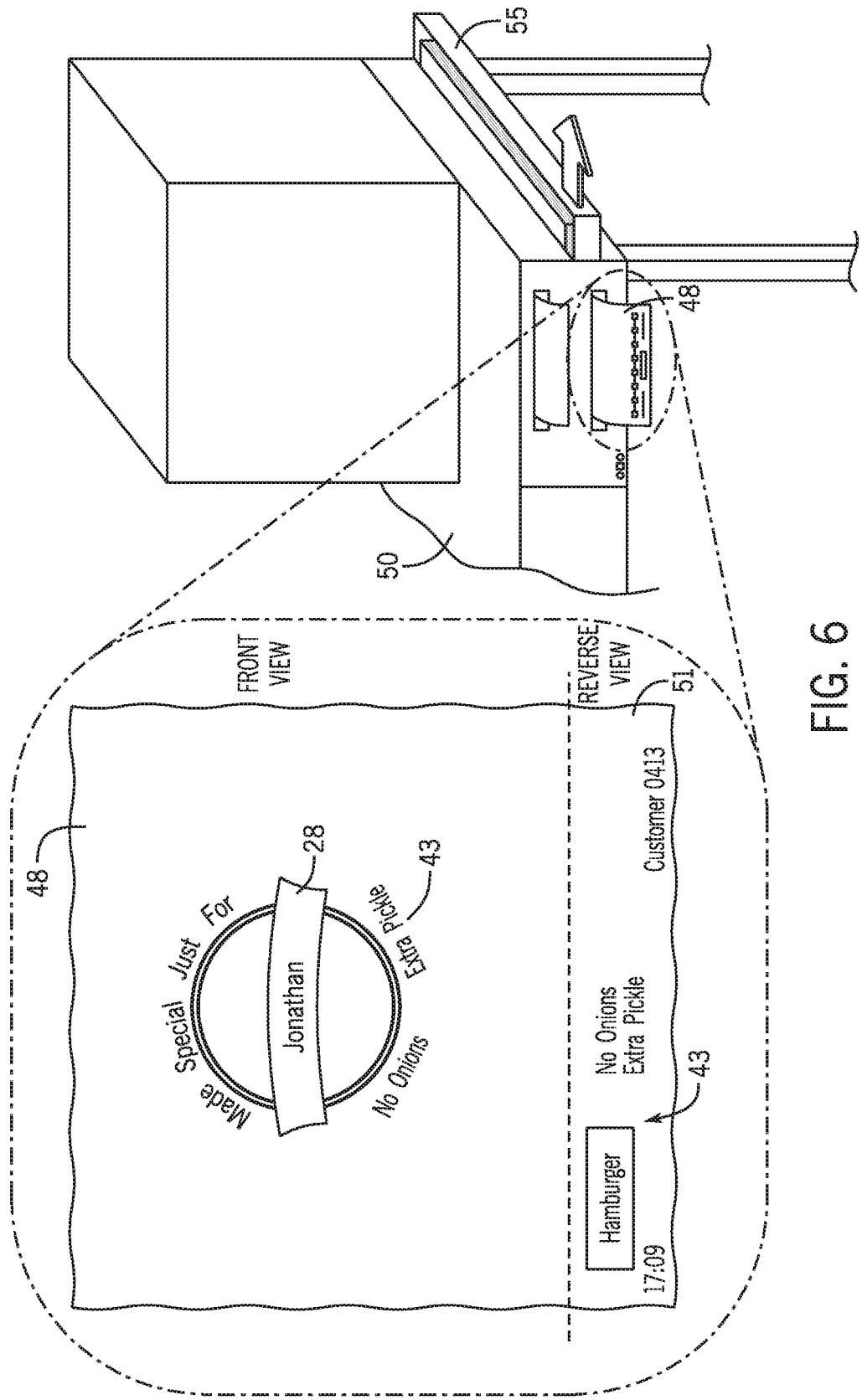
FIG. 6 depicts an exemplary embodiment of a wrapper printer and dispenser.

FIG. 6 depicts an exemplary embodiment of a packaging dispenser 50. In an exemplary embodiment, the packaging dispenser 50 operates in the manner of a printer that feeds paper wrappers therethrough. The dispenser 50 includes a supply of blank wrappers in a drawer 55 for printing and/or dispense. Some embodiments may operate solely as a paper feeder, while other embodiments may incorporate a printer head to print with food safe ink onto the wrappers. While the example of a wrapper packaging is used, a person of ordinary skill in the art will recognize from this disclosure that other forms of food packaging as are commonly found in the restaurant industry may also be dispensed.

The packaging dispenser 50 is communicatively connected to the IOT system 34 (FIG. 2) to receive information regarding the current orders, including the required packaging for each order. The packaging dispenser 50 operates according to this information to dispense the required wrapper, or print and dispense a custom wrapper 48 for each sandwich order. As shown in FIG. 6, the custom wrapper 48 exemplarily includes a customer name 28, if the information is available through the IOT system 34, for example, from the KMS. The wrapper 48 may also include other customer personalized information if the customer has shared such information with the KMS. This may be printed on the outside of the wrapper such that once the order is assembled, the customer can readily identify the owner and content of the food wrapped therein. On the reverse side 51 of the wrapper 48, printed order information 43 can be provided to assist a kitchen worker. This information can include an identification of the sandwich to be wrapped, any customizations to the ordered sandwich, a customer order number, and a timestamp of the customer order. In still further exemplary embodiments, customized promotions, advertisements, or other information may be printed on the wrapper based, for example, upon the specific order to be placed within that wrapper.

As the packaging dispenser 50 may be operated as an automated portion of the sandwich preparation system 30, further embodiments may further position the toasted bun portions on the dispensed packaging with the condiments dispensed on the bun portions. The bun portions may be provided to the kitchen worker in this condition.

Figure 7:
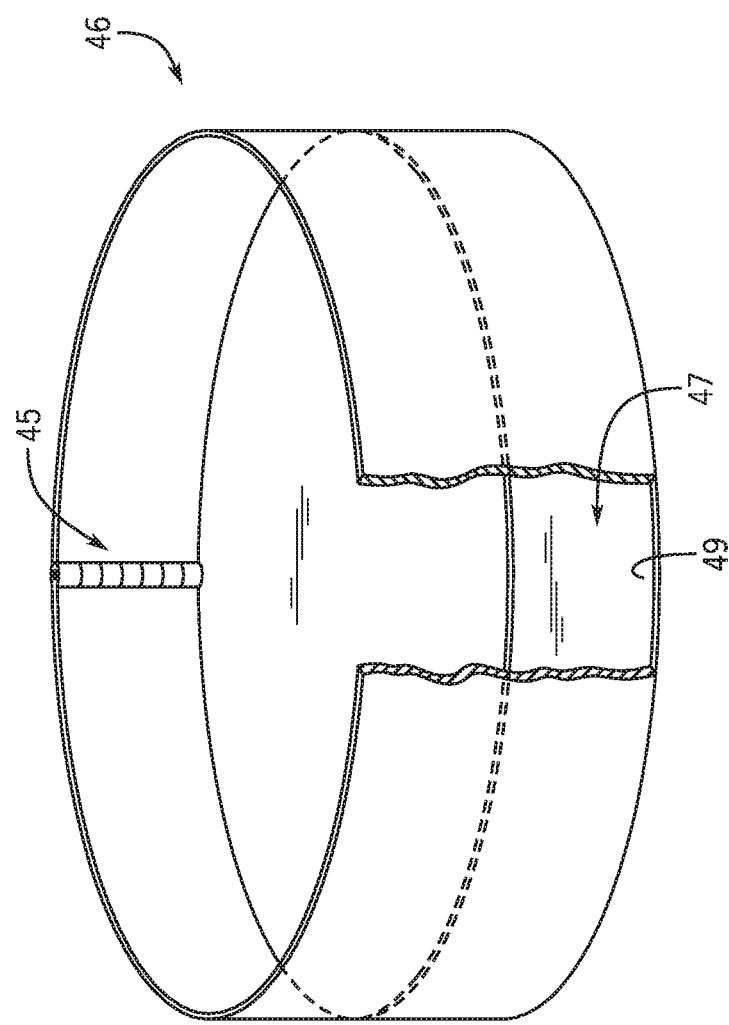
FIG. 7 depicts an exemplary embodiment of a pseudo-bun.

In an exemplary embodiment, the manual tasks 20B are performed in parallel to the automated tasks 20A. As discussed above, traditionally, the manual tasks 20B are performed after the bun has been toasted and the manual tasks 20B performed directly onto the toasted bun portions. However, if the manual tasks 20B are to be performed in parallel to toasting of the buns, then a vehicle is needed to hold the protein and condiments while the bun portions are toasted and sauced. In an embodiment, those sandwich ingredients may be placed directly onto the dispensed packaging. In another embodiment this is facilitated with the use of a pseudo-bun 46 which is exemplarily depicted in FIG. 7. The pseudo-bun 46 performs the previous function of the bun in the assembly of the ordered food, namely the function of holding the interior ingredients, for example, vegetables and protein as the order is assembled. With the use of the pseudo-bun 46, the worker may begin the manual tasks 20B at the same time that the automated tasks 20A are carried out by the system. In exemplary embodiments, the pseudo-bun may be a dish or tray as shown in FIG. 7. As also shown in FIG. 7, the pseudo-bun 46 may include one or more compartments 47 (shown in cut-away) which further hold the ingredients apart from one another until final assembly with the automatedly prepared buns. While not depicted, the pseudo-bun 46 may include doors or slides that facilitate opening the pseudo-bun 46 to place the food items on the bun. In the embodiment depicted in FIG. 7, the pseudo-bun 46 may include a hinge 45 about which portions of the pseudo-bun 46 may rotate, either to separate halves of a particular compartment 47, or to rotate compartments 47 relative to one another to dispense the assembled food. In a still further embodiment, the floor 49 of the pseudo-bun 46 is either rotatable (e.g. about hinge 45) or slidable relative to the rest of the device to dispense the assembled food onto the bun.

In operation and use, the received order is processed by the KMS and the IOT system 34 provides the worker with some form of a notification of an incoming order, including, but not limited to audio notification, or visual notification on one or more graphical displays positioned within the kitchen, or in relation to a personal graphical display relevant to an individual worker, for example as provided on a personal mobile computing device. At the same time, the IOT system 34 provides the customer name, order, and customizations or custom ingredients or other instructions to the wrapper dispenser 50 which prints a custom wrapper. If the packaging is used to hold the interior ingredients during assembly, the worker retrieves the custom wrapper and begins manual assembly of the interior components of the ordered sandwich.

Figure 8:
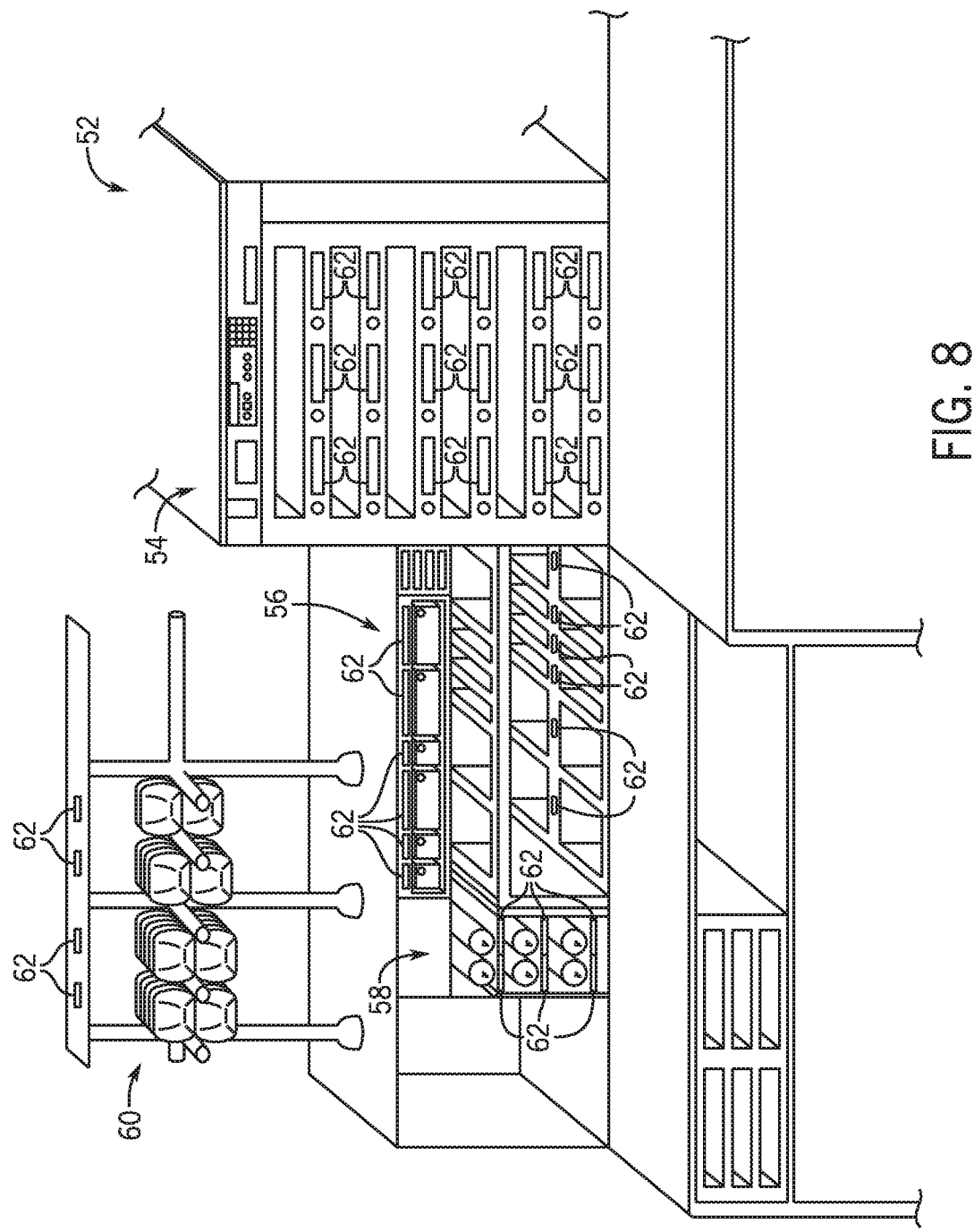
FIG. 8 depicts an exemplary embodiment of a preparation table.

FIG. 8 depicts an exemplary embodiment preparation table 52 within the present disclosure. The prep table 52 exemplarily includes a plurality of components, some or all of which may be used by the worker to assemble the interior of the sandwich, or in further exemplary embodiments, to assemble a sandwich on an already supplied bun. The preparation table 52 includes hot holding 54, cold holding 56, condiment dispensing 58, and, for embodiments/orders wherein the packaging was not automatedly dispensed by the packaging dispenser 50, specialty packaging holding 60. As described herein, exemplary embodiments of the preparation table 52 are communicatively connected to the KMS through the IOT system 34. In an exemplary embodiment, the hot holding 54 operates to hold precooked protein at a temperature and condition so as to prolong food quality and palatability. The cold holding 56 includes chilled wells or compartments in which cold ingredients, for example, vegetables and cheeses may be held. While an automated condiment dispenser 42 was previously discussed, it will be recognized in that in an alternative embodiment, condiments may be manually dispensed by the worker, or in era further instance specialty condiments may be dispensed manually by a worker while base condiments, for example, ketchup, mustard, or mayonnaise are automatedly dispensed as previously described.

In an exemplary embodiment, each of the components of the prep table 52 include one or more visual indicators 62. These visual indicators 62 are exemplarily LED lights which are communicatively connected to the IOT system 34 and operated to illuminate in an identifiable manner to indicate to the worker the component ingredients of the sandwich to be assembled, for example by illumination. In this manner, the worker need only know the appropriate order in which to use the stations of the preparation table 52 and to follow the visual indications according to that which is provided by the IOT system 34. In still further exemplary embodiments, multiple colors of visual indicators 62 may be used and illuminated, for example, to provide an indication to multiple workers simultaneously working at the same preparation table 52.

Integrated data from the IOT system 34 into the preparation table 52 itself enables the visual order indicator to visually identify and/or light up the trays, bins, or racks that hold the exact ingredient (vegetables, meat, condiments, and container) for a given ordered sandwich. In still further exemplary embodiments the IOT system 34 provides collection of data from the component systems of the preparation table 52 and provides this information to the KMS. These communications enable inventory tracking by the KMS of the various component systems of the preparation table 52. Warning signals or messages can be produced to warn of low or reduced inventory of particular food components. This inventory feedback may be useful with the communication enabled sandwich preparation system to operate to reduce overall holding time, for example of hot protein, by more tightly controlling protein cooking, even approaching cook-to-order protein cooking as may be initiated by communications through the IOT system 34.

Figure 9:
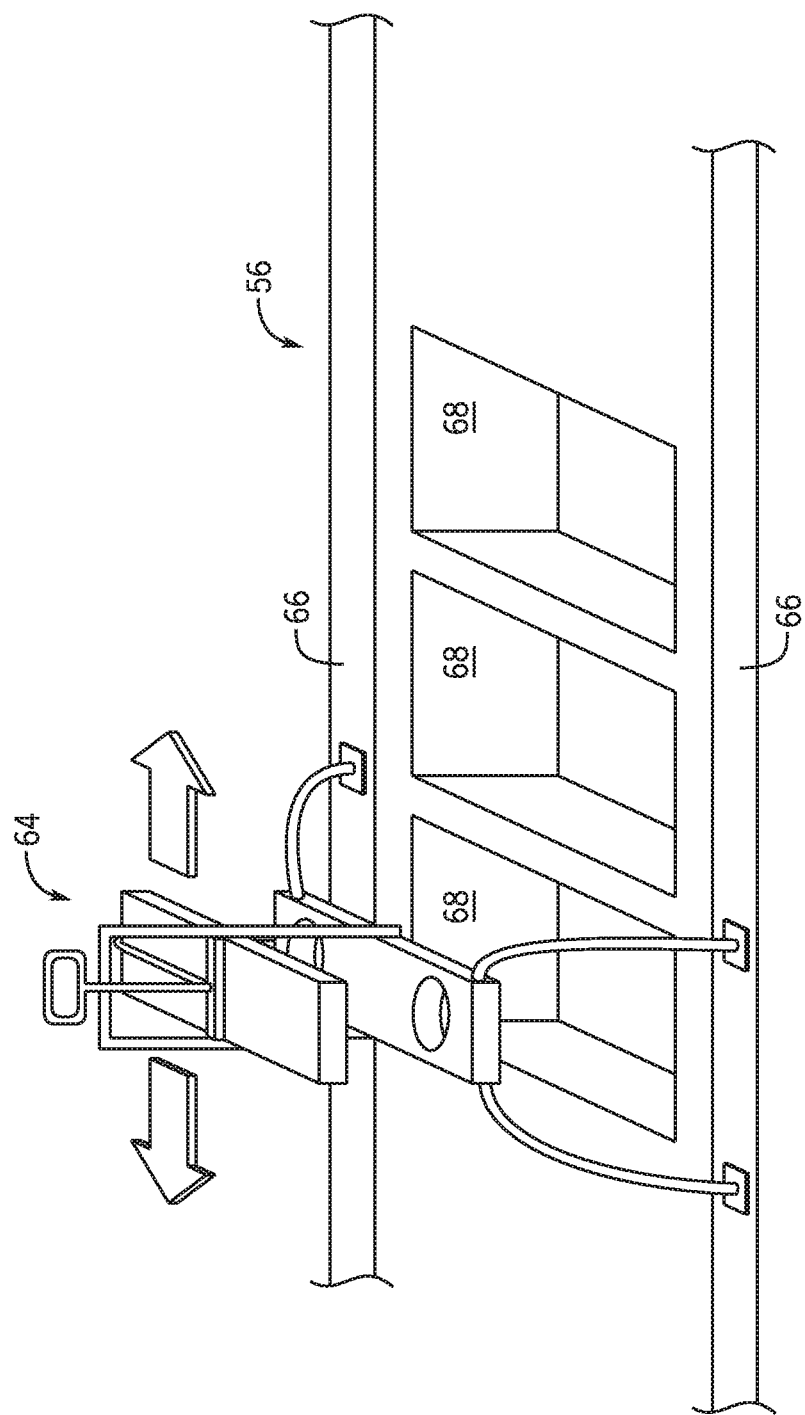
FIG. 9 depicts an exemplary embodiment of a slicer integrated with a cold storage prep table.

In exemplary embodiments, the cold holding 56 may use Peltier (thermoelectric) which may be more efficient in energy and preparation table space use by enabling more closely positioned hot and cold holding bins. In addition to the visual indications as shown in FIG. 8 and discussed above, cold produce freshness may be increased by, for example directly integrating produce slicing relative to the prep table. FIG. 9 exemplarily depicts an embodiment of a slicer 64 integrated with a cold storage prep table 56. In an exemplary embodiment, the slicer 64 may, for example, be a Saber Mini slicer available from Prince Castle LLC, while other slicers may also be used. The slicer 64 may be movable within rails 66 to slide relative to the plurality of cold storage wells 68 within which various sliced vegetables, for example, but not limited: tomato, onions, lettuce, green peppers, cucumber, and others as will be recognized by a person of ordinary skill in the art.

Figure 10:
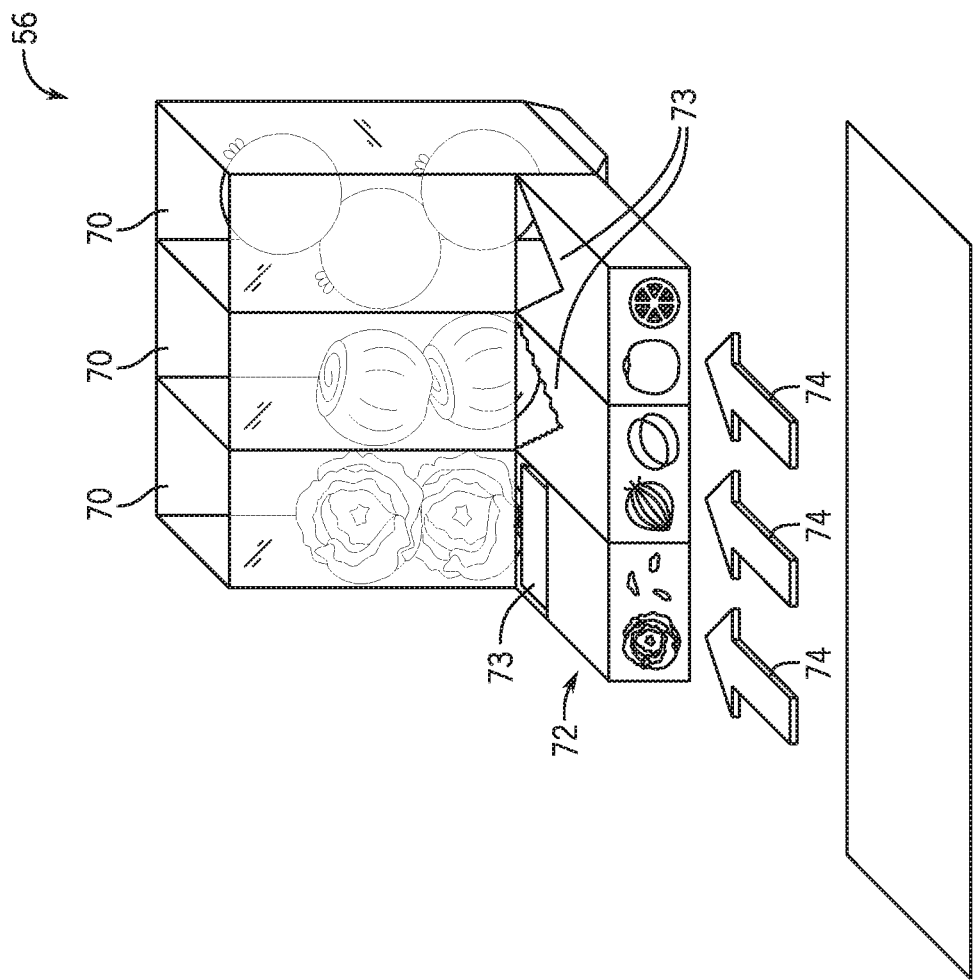
FIG. 10 depicts a further exemplary embodiment of a cold holding system.

FIG. 10 depicts a still further exemplary embodiment of a cold holding system 56. In the embodiment of the cold holding system 56 depicted in FIG. 10, the vegetables are held in hoppers 70 which may exemplarily be temperature controlled creating an environment suited for freshly holding the respective vegetables. The hoppers 70 may be transparent to provide a visual indication of the remaining vegetables in the hoppers 70. A dispenser unit 72 is associated with the hoppers 70 and is operable to dispense a predetermined amount of the requested vegetables out of dispensing areas 74 associated with each of the vegetables. In a still further exemplary embodiment, the dispenser unit 72 includes blades 73 which operate to slice on demand fresh portions of the vegetables held in the hopper 70 so that a freshly sliced portion of each vegetable is dispensed upon each request or activation. The blades 73 may each be specialized or otherwise configured to slice the associated type of produce, including blades with serrations or angled blades. In an exemplary embodiment, the IOT system 34 may be communicatively connected to the cold system 56 and in this manner, the cold system 56 receives instructions through the IOT system 34 from the KMS as to requested vegetables and amounts to create the customer's order and also to receive feedback regarding inventory in the cold holding system 56, for example, a remaining inventory of vegetables within the hoppers 70. Therefore, as with the packaging dispenser 50 described above, while the cold system 56 is described herein as part of the manual tasks 20B, in other embodiments, the cold system 56 may be incorporated with the automated task 20A, for example after the condiment dispenser 42.

Figure 11:
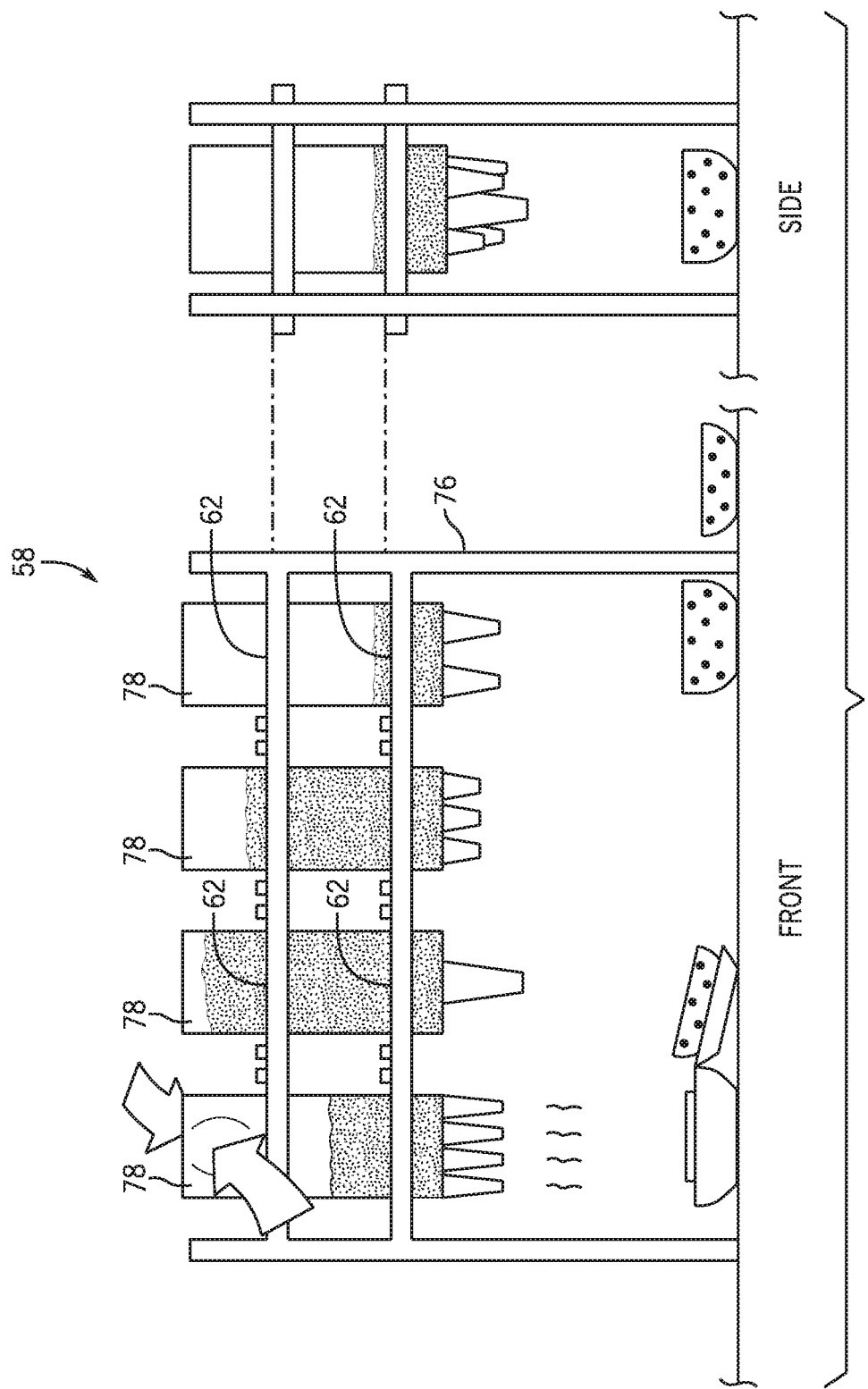
FIG. 11 depicts an exemplary embodiment of condiment dispenser mount.

FIG. 11 depicts an exemplary embodiment of a condiment dispenser mount 58. As noted above with respect to FIG. 8, in alternative embodiments, the dispense of condiments unto the orders may be handled as a manual task 20B (see FIG. 2) as opposed to an automated task 20A. In such an exemplary embodiment, a condiment dispenser mount 58 may include visual indicator 62 as discussed above with respect to FIG. 8, and may also include a rack 76 that is configured to hold condiment dispenser bottles 78 relative to dispensing areas associated with each of condiments. In embodiments, the condiment bottles 78 may be squeeze bottles and may in one embodiment be removed from the frame 76 for dispense of condiment while in another embodiment, the bottles 78 may remain within the frame 76 and the condiment can be dispensed to a dispensing area aligned below each condiment bottle 78. In still further exemplary embodiments, the frame 76 may include integrated scales which measure the weight of the condiment bottles and condiment contained therein. From this measured weight, the remaining inventory of condiment may be tracked, for example with the IOT system 34. In still further examples, use information regarding the number of times that a condiment bottle 78 is removed from the frame and weight measurements taken during the use of the bottle may be recorded and analyzed in order to provide information and insight regarding worker use of the condiment bottles and portions dispensed therefrom. This feedback to the IOT system 34 can further help to provide insight into worker operation and use of the condiments.

Referring back to FIG. 2, in still further exemplary embodiments a steam injection system 80 exemplarily be provided to rapidly melt cheese in the sandwiches. In such an embodiment, this may facilitate cold holding of cheese in a manner so as to prolong quality and ease of use. For example, by holding the cheese at a colder temperature and using the steam to rapidly increase the cheese temperature to melt the cheese and not adversely affect the temperature of the protein in the sandwich delivered to the customer.

By way of reference to FIGS. 1 and 2 in the manners as described above, the sandwich preparation system 30 provides for arrangements in which the manual food assembly tasks 20B may be performed by the food service worker in parallel to automated food assembly tasks 20A such that the combined parallel tasks are finished at approximately the same time and the final food product, for example, a sandwich, is assembled at 82 prior to delivery to the customer.

Figure 12:
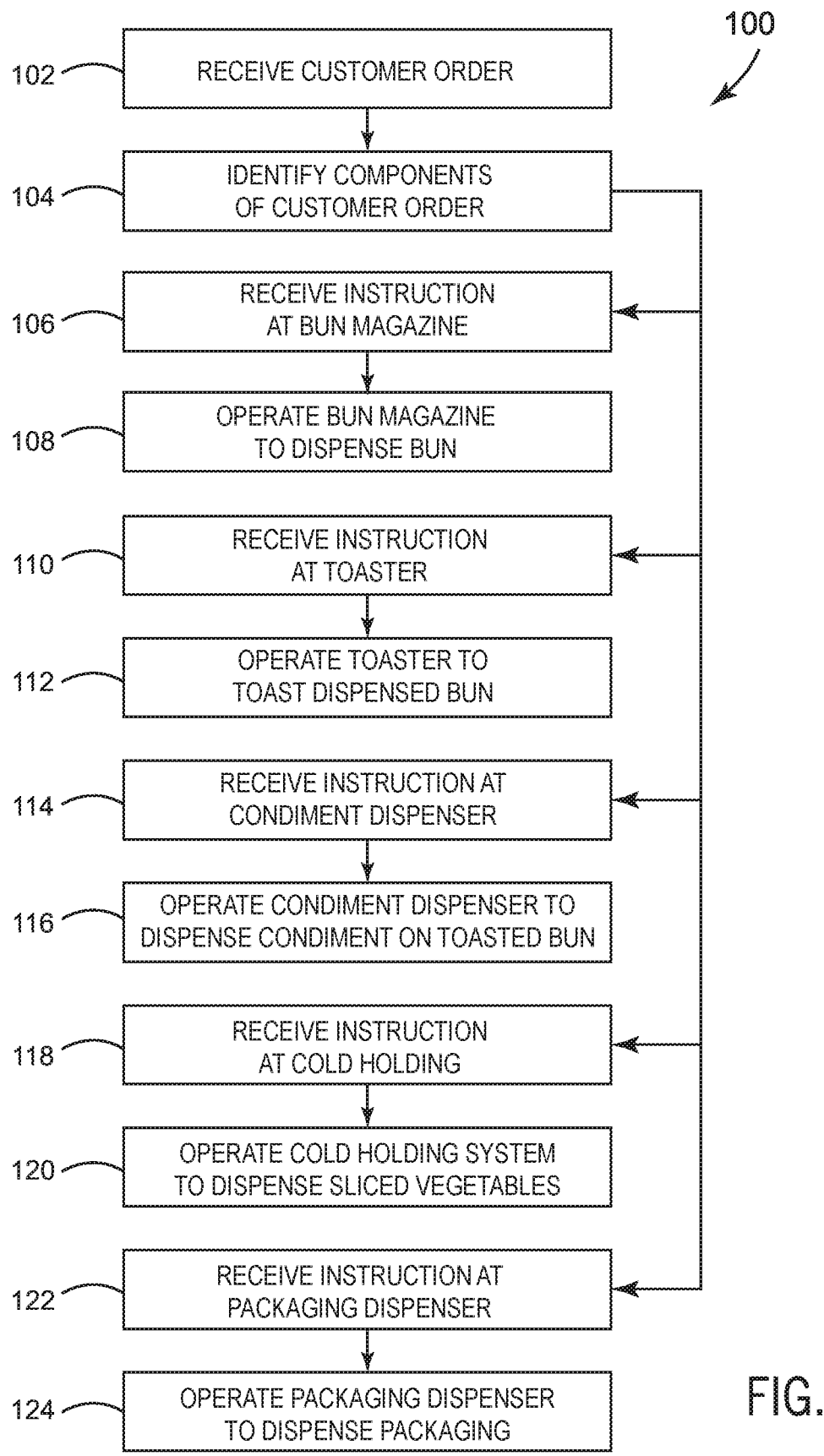
FIG. 12 is a flow chart of an exemplary embodiment of automated order preparation processes.

FIG. 12 is a flow chart of an exemplary embodiment of a method 100 of automated order preparation. The method 100 starts at 102 where a customer order is received. The customer order may be received at a POS system and the customer order specifies one or more food items which require preparation and/or assembly. The POS system may be a register computer operated by a cashier or may be a drive through ordering system, an online ordering system or any other POS order entry arrangement as may be recognized by a person of ordinary skill in the art.

At 104 components of the customer order are identified. In this, a particular food item of the customer order is broken into the components and/or steps to complete the preparation or assembly of the food item for delivery to the customer. As noted above, in some embodiments, the steps may be divided between manual and automated tasks. In the exemplary embodiment described in further detail herein provides examples of the automated tasks that may be performed in the method, although a person of ordinary skill in the art will recognize from the present disclosure that other combinations of tasks between automated and/or manual tasks may be used within the scope of the present disclosure. As noted above, the components or process steps of the customer order may be identified by the KMS and instructions to particular devices as described in further detail herein provided to these devices through the IOT system communicatively connecting the KMS to the devices. It will further be recognized that in other embodiments, the KMS and IOT system may be integrated as a single system in implementations.

At 106, an instruction for an identified bun in the customer order is provided through the IOT system and is received at a bun magazine. The bun magazine, as described above, operates to maintain a supply of buns in an environment suitable for holding that supply of buns in conditions so as to preserve bun quality. Upon receiving the instruction at 106, the bun magazine operates at 108 to dispense the requested bun. In exemplary embodiments, the bun magazine may store multiple types of buns or the bun magazine may comprise a plurality of magazines holding different types of buns from which the received instruction identifies a bun selection. The bun magazine may use active or passive (e.g. gravity) conveyance to dispense the bun out of the bun magazine.

At 110, an instruction for an identified toasting condition of the bun in the customer order is provided through the IOT system and is received at a toaster. The identified components of the customer order at 104 may identify a requested toasting condition or effect and/or particular toasting settings or conditions may be associated with an identified bun in an ordered food item. These toasting instructions are provided to the toaster. Additionally, the toaster may operate to detect receiving the dispensed bun from the bun magazine. At 112 the toaster operates to toast the bun dispensed by the bun magazine and received by the toaster to the toasting conditions as received in the instruction at 110.

At 114, an instruction for a selection of a condiment in the customer order is provided through the IOT system and is received at a condiment dispenser. The condiment dispenser receives the instruction for a selection of condiments as identified as a component of food item for the customer order. The condiment dispenser may be configured to dispense a single type of condiment or may be configured to be capable of dispensing multiple types of condiments either sequentially or simultaneously. The condiment dispenser operates to dispense condiments on the toasted bun at 116. The condiment dispenser may additionally operate as described above to detect that the toasted bun has been located relative to the condiment dispenser at a location to receive the dispensed condiment. Upon such detection, the condiment dispenser may operate to dispense the instructed selection of condiment.

At 118, a cold holding system may receive an instruction through the IOT with an identification of cold toppings, for example, sliced lettuce, onions, and/or tomatoes to complete the food item of the customer order. The cold holding system may operate at 120 based upon this instruction to dispense sliced vegetables. In an exemplary embodiment, the cold holding system may operate to slice portions of vegetables from half vegetables based upon the instructions received at 118.

At 122 instructions of a selected packaging type may be received through the IOT system at a packaging dispenser. The instructions may identify a type of packaging to be used with the food items of the customer order. The packaging may be a wrapper. In still further exemplary embodiments, the packaging may be a custom printed wrapper. At 124 the packaging dispenser may operate based upon the instruction received at 122 to dispense the requested packaging. In an embodiment, dispensing the packaging may entail printing customer and/or order information onto a wrapper and feeding and/or otherwise advancing the printed wrapper out of the packaging dispenser.

As previously noted it will be recognized that embodiments of the method 100 may use some or all of the steps as presented above and may use such steps in different orders than those as necessarily presented above.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for preparation of a sandwich, the system comprising:
    a kitchen management system (KMS) that receives an order for the sandwich and determines a plurality of automated tasks to produce an automatedly prepared portion of the sandwich and a plurality of manual tasks to produce an interior portion of the sandwich, the automatedly prepared portion comprising a bun and at least one condiment;

a toaster that operates to toast the bun according to toaster settings;

a bun magazine that operates to deliver the bun into the toaster;

a condiment dispenser that receives the bun from the toaster and operates to dispense at least one portion of at least one condiment on the bun;

a hot holding system configured to hold cooked protein, the hot holding system comprising at least one visual indicator;

a cold holding system configured to hold vegetables, the cold holding system comprising at least one visual indicator; and an internet of things (IOT) system that communicatively connects the KMS to the toaster, the bun magazine, the condiment dispenser, the hot holding system, and the cold holding system;

wherein the IOT system communicates toaster settings to the toaster, a bun selection to the bun magazine, and a condiment order to the condiment dispenser, to configure the toaster, bun magazine, and condiment dispenser to produce the automatedly prepared portion of the sandwich;

wherein the IOT system concurrently communicates instructions to the hot holding system to operate at least one visual indicator of the hot holding system to present a visual indication of a protein of the interior portion; and wherein the IOT system concurrently communicates instructions to the cold holding system to operate at least one visual indicator of the cold holding system to present a visual indication of a vegetable of the interior portion.

2. The system of claim 1, wherein the interior portion of the sandwich is manually assembled concurrent to toasting of the bun and dispensing of the at least one condiment and the interior portion is subsequently combined with the automatedly prepared portion to assemble the sandwich.

3. The system of claim 2, further comprising a pseudo-bun configured to hold the protein and the vegetable of the interior portion separate from the bun during manual assembly, wherein the pseudo-bun facilitates positioning the interior portion on the bun in assembly of the sandwich.

4. The system of claim 1, further comprising a prep table comprising the cold holding system and the hot holding system.

5. The system of claim 1, further comprising a point of sale (POS) system configured to receive an input of an order of the sandwich from a customer.

6. The system of claim 5, wherein the KMS receives the food order from the POS system.

7. The system of claim 6, wherein the toaster, the bun magazine, and the condiment dispenser provide operational data to the KMS through the communicative connection of the IOT system.

8. The system of claim 6, wherein the bun magazine further operates to maintain a controlled environment within the bun magazine and further includes a gate operable in response to instructions from the KMS through the IOT system to dispense a bun from the bun magazine into the toaster.

9. The system of claim 6, wherein the toaster further receives the toaster settings from the KMS through the IOT system and automatically adjusts at least one of a platen temperature, a conveyor speed, and a conveyor belt-platen gap in response to the received toaster settings to coordinate toasting of the bun delivered by the bun magazine into the toaster.

10. The system of claim 6, wherein the condiment dispenser further comprises a sensor operable to detect a position of a bun portion relative to the condiment dispenser, wherein based upon an instruction from KMS communicated to the condiment dispenser through the IOT system, the condiment dispenser the operates to dispense at least one portion of at least one condiment on the bun portion at the detected position.

11. The system of claim 10, further comprising a chute that conveys bun portions from the toaster to the condiment dispenser.

12. The system of claim 1, further comprising a wrapper printer communicatively connected to the IOT system, wherein the wrapper printer receives an instruction with identifying information of the food order through the IOT system and individually prints the identifying information of the food order on a wrapper for the food order.

13. The system of claim 1, wherein the cold holding system comprises a plurality of hoppers, each hopper configured to hold a type of vegetable in a controlled environment, and the cold holding system comprises a slicer with a plurality of blades operable to slice vegetables from the controlled environment based upon instructions from the KMS received through the IOT system.

14. The system of claim 13, wherein the slicer is configured to operate upon an instruction communicated to the cold holding system through the IOT system to actuate one or more of the plurality of blades to slice one or more vegetables from the plurality of hoppers.

15. A method of food preparation, comprising:
dividing an order for a sandwich into a plurality of component foods;
bifurcating the plurality of component foods into an automatedly prepared portion of the sandwich comprising a bun and an interior portion of the sandwich comprising a protein and a vegetable;
determining, with a kitchen management system (KMS), the plurality of automated tasks to complete the automated portion;
performing a plurality of automated tasks to produce the automatedly prepared portion of the sandwich, the plurality of automated tasks comprising:
communicating a bun selection from the KMS to a bun magazine;
operating the bun magazine to deliver the bun into a toaster;
communicating toaster settings for the bun from the KMS to the toaster; and
operating the toaster to toast the bun according to toaster settings;
concurrent to performing the plurality of automated tasks, performing a plurality of manual tasks to produce the interior portion, the plurality of manual tasks comprising:
retrieving the protein from a hot holding system;
retrieving the vegetable from a cold holding system; and
holding the interior portion separate from the automatedly prepared portion; and
subsequently assembling the automatedly prepared portion with the interior portion to produce the sandwich.

16. The method of food preparation of claim 15, wherein the plurality of automated tasks further comprises receiving the bun from the toaster at a condiment dispenser and operating the condiment dispenser to dispense at least one portion of at least one condiment onto the bun; and wherein the protein and the vegetable are held on a vehicle separate from the automatedly prepared portion.

17. The method of claim 16, wherein the vehicle comprises a packaging for the sandwich or a pseudo-bun.

18. The method of claim 16, further comprising:
receiving an input of the food order of a customer at a point of sale (POS) system; and
communicating instructions of the automated tasks to the bun magazine, the toaster, and the condiment dispenser from the KMS through an internet of things (IOT) communication system.

19. The method of claim 15, further comprising:
determining, with the kitchen management system (KMS), the plurality of manual tasks to complete the interior portion; and
communicating instructions to the hot holding system and the cold holding system through an internet of things (IOT) communication system to operate a plurality of visual indicators in the hot holding system and the cold holding system to present visual indications of the protein and the vegetable of the interior portion.

20. The method of claim 15, further comprising:
receiving an instruction with identifying information of the order for the sandwich through an internet of things (IOT) communication system at a packaging dispenser;
printing the identifying information of the order for the sandwich on packaging for the sandwich; and
operating a dispensing unit of the cold holding system communicatively connected to the IOT communication system according to instructions from the KMS received through the IOT communication system to slice vegetables held in a controlled environment of the cold holding system.

* * * * *